US008736596B2

(12) United States Patent
Joo et al.

(10) Patent No.: US 8,736,596 B2

(45) Date of Patent: May 27, 2014

(54) LIQUID CRYSTAL DISPLAY PANEL AND DISPLAY DEVICE HAVING THE DISPLAY PANEL

(75) Inventors: Soong-Yong Joo, Seongnam-si (KR); Young-Bae Jung, Hwaseong-si (KR); Jung-Bae Bae, Suwon-si (KR); Jeong-Il Oh, Yongin-si (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 696 days.

(21) Appl. No.: 12/512,641

(22) Filed: Jul. 30, 2009

(65) Prior Publication Data

US 2010/0207927 A1 Aug. 19, 2010

(30) Foreign Application Priority Data

Feb. 16, 2009 (KR) ........................ 10-2009-0012278

(51) Int. Cl.

*G06F 3/038* (2013.01)

*G09G 5/00* (2006.01)

(52) U.S. Cl.

USPC .......................................................... 345/213

(58) Field of Classification Search

USPC .......................................................... 345/213

See application file for complete search history.

(56) References Cited

U.S. PATENT DOCUMENTS

2006/0050205 A1* 3/2006 Yang et al. ...................... 349/98

2007/0052658 A1* 3/2007 Kim ............................. 345/100

FOREIGN PATENT DOCUMENTS

KR 1020060019753 3/2006

KR 1020080036912 4/2008

KR 1020080052733 6/2008

OTHER PUBLICATIONS

English Abstract for Publication No. 1020060019753.

English Abstract for Publication No. 1020080036912.

English Abstract for Publication No. 1020080052733.

* cited by examiner

*Primary Examiner* — Quan-Zhen Wang

*Assistant Examiner* — Nelson D Runkle, III

(74) *Attorney, Agent, or Firm* — F. Chau & Associates, LLC

(57) ABSTRACT

A display panel includes a gate driving circuit, a plurality of gate lines, a plurality of data lines and a dummy gate line. The gate driving circuit is disposed in a peripheral area surrounding a display area. The gate lines are disposed in the display area and receive a plurality of gate signals sequentially outputted from the gate driving circuit. The data lines are disposed in the display area and cross the gate lines. The dummy gate line is disposed adjacent to the last gate line of the gate lines and receives a dummy gate signal transmitted from an external device. Thus, a dummy gate line is adjacent to the last gate line and a pixel electrode connected to the last gate line is affected by a dummy gate signal applied to the dummy gate line.

22 Claims, 7 Drawing Sheets

LIQUID CRYSTAL DISPLAY PANEL AND DISPLAY DEVICE HAVING THE DISPLAY PANEL

CROSS-REFERENCE TO RELATED APPLICATION

This application claims priority under 35 U.S.C. §119 to Korean Patent Application No. 10-2009-0012278, filed on Feb. 16, 2009 in the Korean Intellectual Property Office (KIPO), the contents of which are herein incorporated by reference in their entirety.

BACKGROUND OF THE INVENTION

1. Technical Field

The present invention relates to a display panel and more particularly, to a display panel used for a liquid crystal display (LCD) device and a display device having the display panel.

2. Discussion of the Related Art

Generally, a liquid crystal display (LCD) device includes an LCD panel displaying an image by adjusting the transmittance of a liquid crystal layer, and a backlight assembly disposed below the LCD panel to apply light to the LCD panel.

The LCD device includes an LCD panel, a gate driving circuit and a data driving circuit. The LCD panel has a plurality of gate lines and a plurality of data lines crossing the gate lines. The gate driving circuit outputs a gate signal to the gate lines. The data driving circuit outputs a data signal to the data lines. A plurality of pixels is defined by the data lines and the gate lines. Each pixel includes a switching element electrically connected to the gate line and data line and a pixel electrode electrically connected to the switching element.

A pixel voltage applied to the pixel electrode can be distorted by a parasitic capacitance Cgd generated between a gate electrode and a drain electrode of the switching element. The distorted voltage can be referred to as a kickback voltage.

The kickback voltage may be changed by a gate signal applied to the gate line as well as by the parasitic capacitance Cgd. In a case where the pixel electrode is connected to the next gate line corresponding to a gate line of the pixel electrode, when a gate signal is applied in a forward direction, the pixel electrode is affected by a gate signal applied to a next terminal gate, and accordingly, the kickback voltage may deviate. For example, when a pixel electrode is connected to the last gate line of the gate line for which there is no next gate line, the pixel electrode is not affected by a gate signal applied to a next gate line. Similarly, a pixel electrode connected to a previous gate line is not affected by a gate signal applied to a next gate line. Accordingly, a deviation is generated between a pixel electrode connected to the last gate line and a pixel electrode connected to the previous gate lines, and thus flicker may be generated within a display device. Thus, the display quality of an image may be deteriorated.

SUMMARY OF THE INVENTION

Exemplary embodiments of the present invention provide a display panel capable of increasing the display quality thereof.

Exemplary embodiments of the present invention also provide a display device having the above-mentioned display panel. The gate signal includes a first voltage and a second voltage, and the gate driving circuit sequentially transmits the first voltage of the gate signal to the plurality of gate lines.

According to one aspect of the present invention, a display panel includes a gate driving circuit, a plurality of gate lines, a plurality of data lines and a dummy gate line. The gate driving circuit is disposed in a peripheral area surrounding a display area. The gate lines are disposed in the display area and receive a gate signal. The gate signal includes a first voltage and a second voltage. The gate driving circuit sequentially transmits the first voltage of the gate signal to the plurality of gate lines. The data lines are disposed in the display area and cross the gate lines. The dummy gate line is disposed adjacent to the last gate line of the gate lines and receives a dummy gate signal transmitted from an external device.

In an exemplary embodiment of the present invention, the display panel may further include a connection line, electrically connected to the dummy gate line, transmitting the dummy gate signal to the dummy gate line.

In an exemplary embodiment of the present invention, the gate driving circuit may include a plurality of stages serially connected to each other. A first stage of the plurality of stages may receive a first vertical start signal starting the driving of the gate lines and the last stage of the plurality of stages may receive a second vertical start signal stopping the driving of the gate lines.

In an exemplary embodiment of the present invention, the dummy gate signal may be the second vertical start signal.

In an exemplary embodiment of the present invention, the dummy gate signal may include a third voltage and a fourth voltage. Levels of the third voltage and the fourth voltage are substantially the same as those of the first voltage and the second voltages respectively.

In an exemplary embodiment of the present invention, the gate driving circuit may include a first gate driving part and a second gate driving part. The first gate driving part may include a plurality of odd-numbered stages, connected serially to each other, and may be connected to a plurality of odd-numbered gate lines of the plurality of gate lines and may output the gate signal to the odd-numbered gate lines. The second gate driving part may include a plurality of even-numbered stages connected serially to each other, and may be connected to a plurality of even-numbered gate lines of the plurality of gate lines and may output the gate signal to the even-numbered gate lines.

In an exemplary embodiment of the present invention, a first stage of the odd-numbered stages may receive a first vertical start signal starting the driving of the odd-numbered gate lines and a last stage of the odd-numbered stages may receive a second vertical start signal stopping the driving of the gate lines of the odd-numbered stage. The first stage of the even-numbered stages may receive a third vertical start signal starting the driving of the even-numbered gate lines and the last stage of the even-numbered stages may receive a fourth vertical start signal stopping the driving of the gate lines of the even-numbered stage. The dummy gate signal may be the second vertical start signal.

According to an aspect of the present invention, a display device includes a display panel, a gate driving circuit and a data driving circuit. The display panel includes a display area and a peripheral area surrounding the display area. The display area includes a plurality of gate lines, a plurality of data lines crossing the gate lines, and a dummy gate lines disposed adjacent to the last gate line of the gate lines. The dummy gate line receives a dummy gate signal transmitted from an external device. The gate driving circuit is integrated in the peripheral area and outputs a gate signal to the gate lines. The gate signal includes a first voltage and a second voltage. The gate driving circuit sequentially outputs the first voltage of the gate signal to the gate lines. The data driving circuit outputs a plurality of data signals to the data lines.

In an exemplary embodiment of the present invention, the display panel may further include a connection line electrically connected to the dummy gate line transmitting the dummy gate signal to the dummy gate line.

In an exemplary embodiment of the present invention, the gate driving circuit may include a plurality of stages serially connected to each other. A first stage of the stages may receive a first vertical start signal starting the driving of the gate lines and the last stage may receive a second vertical start signal stopping the driving of the gate lines.

In an exemplary embodiment of the present invention, the dummy gate signal may be the second vertical start signal.

In an exemplary embodiment of the present invention, a last gate line of the plurality of gate lines may be a gate line receiving the first gate signal of the gate signal sequentially outputted from the gate driving circuit.

In an exemplary embodiment of the present invention, the gate driving circuit may include a first gate driving part and a second gate driving part. A first gate driving part may include a plurality of odd-numbered stages serially connected to each other. The first gate driving part may be connected to a plurality of odd-numbered gate lines of the gate lines and may output the gate signal to the odd-numbered gate lines. A second gate driving part may include a plurality of even-numbered stages serially connected to each other. The second gate driving part may be connected to a plurality of even-numbered gate lines and may output the gate signal to the even-numbered gate lines.

In an exemplary embodiment of the present invention, a first stage of the odd-numbered stages may receive a first vertical start signal starting the driving of the odd-numbered gate lines and a last stage of the odd-numbered stages may receive a second vertical start signal stopping the driving of the gate lines of the odd-numbered stage. A first stage of the even-numbered stages may receive a third vertical start signal starting the driving of the even-numbered gate lines in which the third vertical start signal is delayed for a first horizontal cycle 1H (where H represents a horizontal cycle) with respect to the first vertical start signal and a last stage of the even-numbered stages may receive a fourth vertical start signal stopping the driving of the gate lines of the even-numbered stage.

In an exemplary embodiment of the present invention, the dummy gate signal may be the second vertical start signal.

In an exemplary embodiment of the present invention, a last gate line of the plurality of gate lines may be a gate line receiving a first voltage of gate signal outputted from the first gate driving part.

In an exemplary embodiment of the present invention, the odd-numbered stages may be integrated in a first peripheral area corresponding to a first terminal of the gate lines. The even-numbered stages may be integrated in a second peripheral area corresponding to a second terminal of the gate lines.

In an exemplary embodiment of the present invention, the odd-numbered stages may receive a first clock signal and a second clock signal having a phase opposite to the first clock signal. The even-numbered stage may receive a third clock signal delayed for 1H with respect to the first clock signal and a fourth clock signal having a phase opposite to the third clock signal.

In a display panel, according to an exemplary embodiment of the present invention, and a display device having the display panel, a dummy gate line is adjacent to the last gate line, so that a pixel electrode connected to the last gate line is affected by a dummy gate signal applied to the dummy gate line. Thus, flicker may be prevented from being generated in a pixel electrode connected to the last gate line.

BRIEF DESCRIPTION OF THE DRAWINGS

The above and other features and advantages of the present invention will become more apparent by describing in detailed exemplary embodiments thereof with reference to the accompanying drawings, in which.

DETAILED DESCRIPTION OF THE EXEMPLARY EMBODIMENTS

Figure 1:
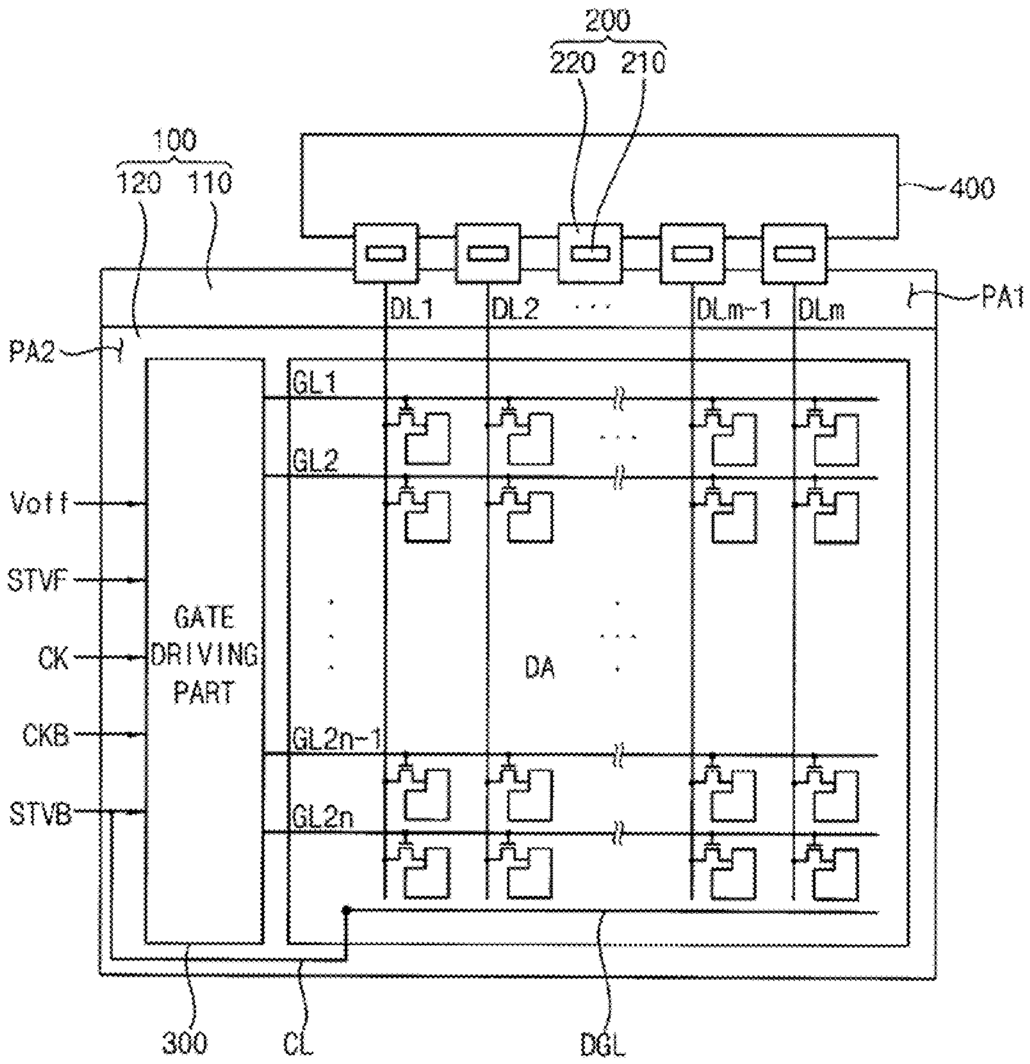
FIG. 1 is a plan view illustrating a display device according to an exemplary embodiment of the present invention.

Exemplary embodiments of the present invention are described more fully hereinafter with reference to the accompanying drawings. The present invention may, however, be embodied in many different forms and should not be construed as limited to the exemplary embodiments set forth herein. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present.

Exemplary embodiments of the invention are described herein with reference to cross-sectional illustrations that are schematic illustrations of idealized exemplary embodiments (and intermediate structures) of the present invention. As such, variations from the shapes of the illustrations as a result, for example, of manufacturing techniques and/or tolerances, are to be expected. Thus, exemplary embodiments of the present invention should not be construed as limited to the particular shapes of regions illustrated herein but are to include deviations in shapes that result, for example, from manufacturing.

Hereinafter, exemplary embodiments of the present invention will be explained in detail with reference to the accompanying drawings.

FIG. 1 is a plan view illustrating a display device according to an exemplary embodiment of the present invention.

Referring to FIG. 1, the display device includes a display panel 100, a gate driving circuit 300, a data driving circuit 200 and a printed circuit board (PCB) 400.

The display panel 100 may include a display substrate 110, an opposite substrate 120 and a liquid crystal layer (not shown) interposed between the display substrate 110 and the opposite substrate 120. The display panel 100 may include a display area DA and a peripheral area PA surrounding the display area DA.

A plurality of gate lines GL1, GL2, . . . , GL2*n*−1, GL2*n* (wherein 'n' is a natural number), a dummy gate line DGL and a plurality of data lines DL1, DL2, . . . , DLm−1, DLm (wherein 'm' is a natural number) crossing the gate lines GL1 to GL2n are formed in the display substrate. A plurality of pixel parts is electrically connected to the gate lines GL1 to GL2n and the data lines DL1 to DLm. Each of the pixel parts includes a thin-film transistor (TFT) and a pixel electrode electrically connected to the TFT. Each of the pixel parts is disposed following each of the gate lines.

The gate lines GL1 to GL2n are electrically connected to the gate driving circuit 300 to receive a gate signal. The gate signal comprises a first voltage and a second voltage. The gate lines GL1 to GL2n sequentially receive the first voltage outputted from the gate driving circuit 300.

The dummy gate line DGL is disposed adjacent to the last gate line GL2n of the gate lines GL1 to GL2n, and receives a dummy gate signal transmitted from an external device. The last gate line GL2n is a gate line receiving the first voltage of the gate signal outputted from the gate driving circuit 300. The dummy gate signal comprises a third voltage and a fourth voltage. Levels of the third voltage and the fourth voltage may be the same as those of the first voltage and the second voltage, respectively.

The peripheral area PA includes a first peripheral area PA1 disposed on a first terminal of the data lines DL and a second peripheral area PA2 disposed on a first terminal of the gate lines GL.

The data driving circuit 200 includes a data driving chip 210 outputting the data signals to the data lines DL1 to DLm and a flexible printed circuit board (FPCB) 220 having the data driving chip 210 mounted thereon. A first terminal of the FPCB 220 is connected to the first peripheral area PA1 of the display panel 100, and a second terminal of the FPCB 220 is connected to the PCB 400. The FPCB 220 electrically connects the PCB 400 to the display panel 100.

Although the above exemplary embodiments discuss the data driving chip 210 being mounted on the FPCB 220, the invention should not be understood as being limited to that particular exemplary embodiment. Other configurations may be provided. For example, the driving chip 210 may be mounted on the display panel 100. Alternatively, the driving chip 210 may be integrated on the first peripheral area PA1 of the display panel 100.

The gate driving circuit 300 is an integrated circuit integrated on the second peripheral area PA2 of the display panel 100. The gate driving circuit 300 includes a shift register in which a plurality of stages are each serially connected to each other to sequentially output a gate signal to the gate lines GL.

The gate driving circuit 300 generates the gate signals for driving the gate lines GL1 to GL2n by using a gate off voltage Voff received from an external device, a first vertical start signal STVF, a second vertical start signal STVB, a first clock signal CK and a second clock signal CKB. The gate driving circuit 300 sequentially outputs the first voltage included in the gate signal to the gate lines GL1 to GL2n. The first and second vertical start signals STVF and STVB, the first and second clock signals CK and CKB may be transmitted from a timing control part (not shown) which controls driving timing of the gate driving circuit 300. The timing control part may be mounted on the PCB 400.

Although the above exemplary embodiments discuss the timing control part being mounted on the PCB 400, it should be understood that the invention is not limited to that particular configuration. For example, the timing control part may be mounted on the display panel 100. Alternatively, the timing control part may be integrated on the first peripheral area PA1 of the display panel 100.

The display panel 100 may further include a connection line CL. The connection line CL is electrically connected to the dummy gate line DGL and transmits the dummy gate signal to the dummy gate line DGL. In this case, the dummy gate signal may be the second vertical start signal STVB.

Figure 2:
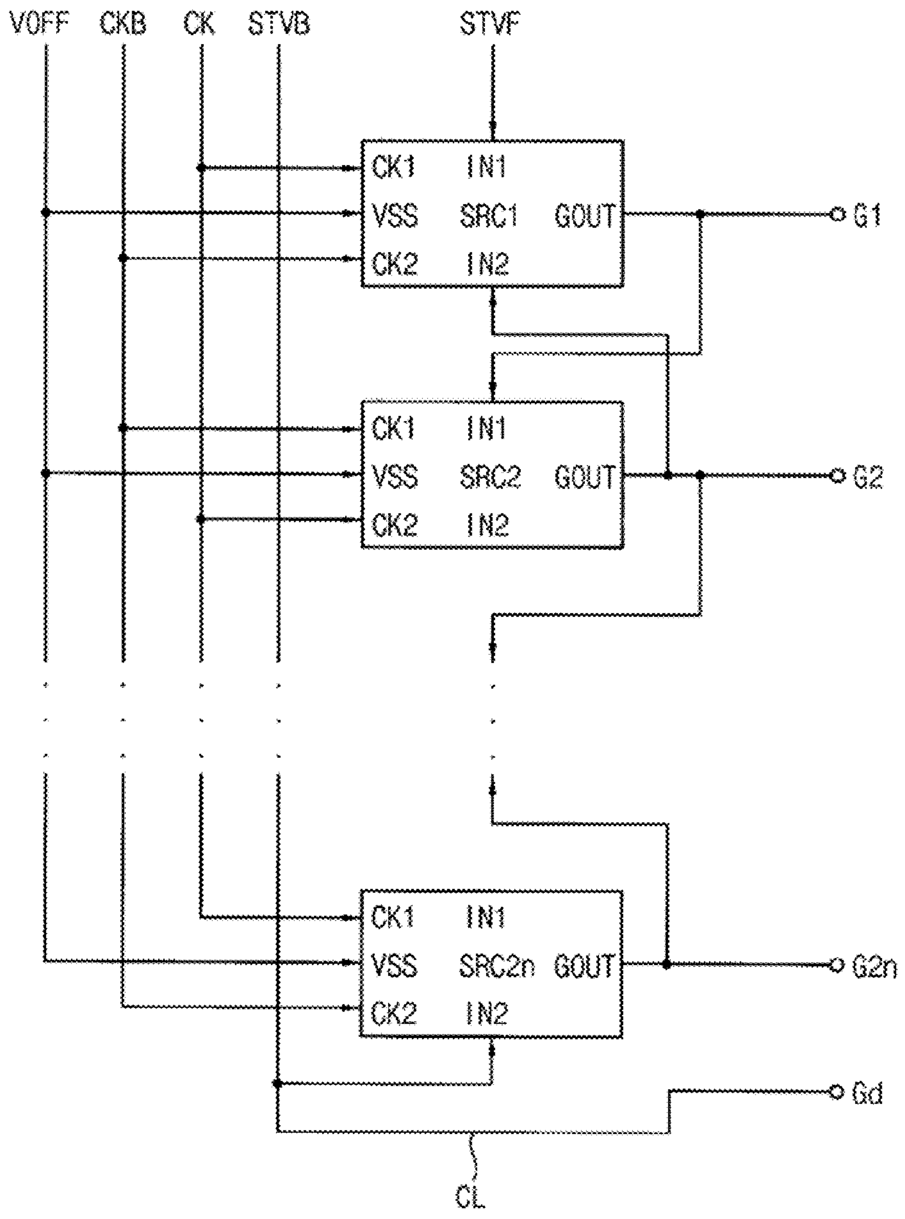
FIG. 2 is a block diagram illustrating the gate driving part of FIG. 1.

FIG. 2 is a block diagram illustrating a first gate driving part of FIG. 1.

Referring to FIGS. 1 and 2, the gate driving circuit 200 may include a plurality of stages SRC1, SRC2, . . . , SRC2n serially connected to each other. The stages SRC1 to SRC2n are respectively connected to the gate lines GL1 to GL2n to output the gate signal to the gate lines GL1 to GL2n and the gate signal includes the first voltage and the second voltage. The first voltage is sequentially transmitted to the gate lines GL1 to GL2n.

The dummy gate line DGL is electrically connected to the connection line CL to receive the second vertical start signal STVB which comprises the third voltage and the fourth voltage.

Each of stages may include a first clock terminal CK1, a second clock terminal CK2, a first input terminal IN1, a second input terminal IN2, a voltage terminal VSS and an output terminal GOUT.

The first and second clock terminals CK1 and CK2 receive a first clock signal CK and the second clock signal CKB having phases opposite to each other. For example, a first clock terminal CK1 of a plurality of odd-numbered stages SRC1, SRC3, . . . , and SRC2n−1 receives the first clock signal CK, and a second clock terminal CK2 of the odd-numbered stages receives the second clock signal CKB. A first clock terminal CK1 of a plurality of even-numbered stages SRC2, SRC4, . . . , and SRC2n receives the second clock signal CKB, and a second clock terminal CK2 of the even-numbered stages receives the first clock signal CK.

The first input terminal IN1 receives the first vertical start signal STVF or an output signal of a previous stage. For example, the first input terminal IN1 of the first stage SRC1 receives the first vertical start signal STVF and the first input terminal IN1 of the second to n-th stages SRC2 to SRC2n receives the output signal of previous stages SRC1 to SRC2n−1.

The second input terminal IN2 receives the second vertical start signal STVB or an output signal of a next stage. The second input terminal IN2 of the first to 2n−1-th stages SRC1 to SRC2n−1 receives the output signal of next stages SRC2 to SRC2n, and the second input terminal IN2 of the last stage SRC2n receives the second vertical start signal STVB. The second vertical start signal STVB may be a signal stopping a frame.

The voltage terminal VSS receives the gate off voltage VOFF.

The output terminal GOUT is electrically connected to a gate line to output the gate signal to the gate lines. The output terminal GOUT is electrically connected to the second input terminal IN2 of a previous stage to apply the output signal to the second input terminal IN2 of the previous stage. The output terminal GOUT is electrically connected to the first input terminal IN1 of a next stage to apply the output signal to the first input terminal IN1 of the next stage.

Figure 3:
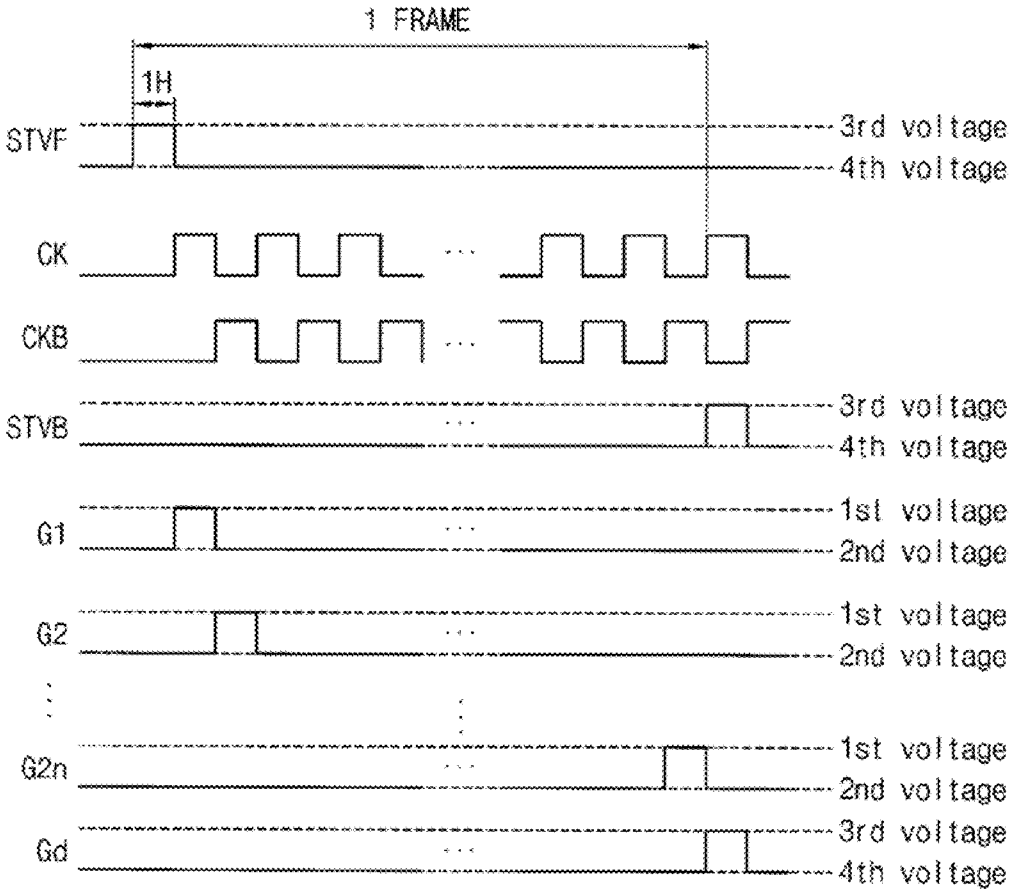
FIG. 3 is a waveform diagram illustrating input and output signals of the gate driving circuit of FIG. 2.

FIG. 3 is a waveform diagram illustrating input and output signals of the gate driving circuit of FIG. 2.

Referring to FIGS. 2 and 3, the first input terminal IN1 of the stages SRC1 to SRC2n receives the first vertical start signal STVF or an output signal of a previous stage. The first and second clock terminals CK1 and CK2 of the stages receive the first and second clock signals CK and CKB. The second input terminal IN2 of the stages receives the second vertical start signal STVB or an output signal of a next stage.

When the first input terminal IN1 of each stages receives the first vertical start signal STVF or the output signal of a previous stage, the first voltage of the gate signal G1 to G2*n* of the gate lines GL1 to GL2*n* are sequentially outputted at the base of the first and second clock signals CK and CKB. Each of the first and second vertical start signals STVF and STVB comprises the third voltage and the fourth voltage. The third voltages of the first and second vertical start signals STVF and STVB have a pulse width of 1H. The first and second clock signals CK and CKB have a pulse width of 1H. The first and second clock signals CK and CKB are inverted for a 1H period.

For example, the first stage SRC1 of the stages SRC1 to SRC2*n* responds to the third voltage of the first vertical start signal STVF to output a high level of the first clock signal CK as a first voltage of a gate signal G1 to the first gate line GL1. Then, the second stage SRC2 of the stages SRC1 to SRC2*n* responds to the first voltage of the output signal at the first stage SRC1 to output a high level of the second clock signal CKB as a first voltage of a gate signal G2 to the second gate line GL2.

The last stage SRC2*n* of the stages SRC1 to SRC2*n* responds to a first voltage of the output signal at the previous stage SRC2*n*−1 to output a high level of the second clock signal CKB as a first voltage of a gate signal G2*n* to the last gate line GL2*n*. When the second input terminal IN2 of the last stage SRC2*n* receives the third voltage of the second vertical start signal STVB, the last gate signal G2*n* outputted to the last gate line GL2*n* is converted to a second voltage of the gate signal. Levels of the third voltage and fourth voltage included in the first and second vertical start signals STVF and STVB may be the same as those of the first and second voltage of gate signals, respectively.

The second vertical start signal STVB is transmitted to the dummy gate line DGL through the connection line CL.

According to an exemplary embodiment, a pixel electrode connected to the last gate line GL2*n* is affected by a gate signal applied to a next terminal of gate line, in the same way as a pixel electrode connected to the previous gate line. Thus, a deviation of a kickback voltage is generated according to the position of the pixel electrode to prevent the generation of flicker.

Figure 4:
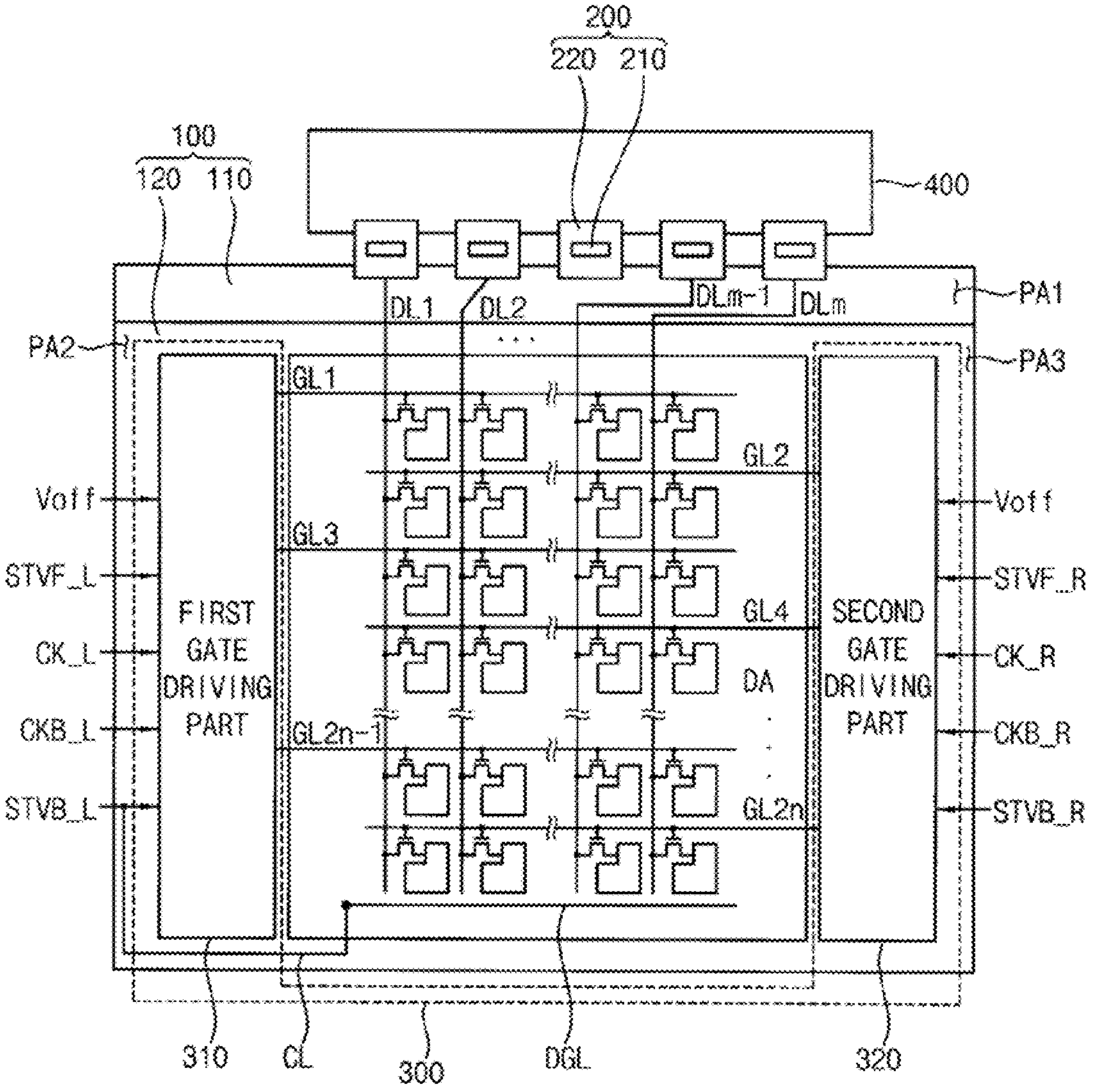
FIG. 4 is a plan view illustrating a display device according to an exemplary embodiment of the present invention.

FIG. 4 is a plan view illustrating a display device according to an exemplary embodiment of the present invention.

Referring to FIG. 4, the display device includes a display panel 100, a data driving circuit 200, a gate driving circuit 300 and a PCB 400. The gate driving circuit 300 includes a first gate driving part 310 and a second gate driving part 320.

The display panel 100 may include a display substrate 110, an opposite substrate 120 facing the display substrate 110, and a liquid crystal layer (not shown) interposed between the display substrate 110 and the opposite substrate 120. The display panel 100 may include a display area DA and a peripheral area PA surrounding the display area DA.

A plurality of gate lines GL1, GL2, GL3, GL4, . . . , GL2*n*−1, GL2*n* and a plurality of data lines DL1, DL2, . . . , DLm−1, DLm crossing the gate lines GL1 to GL2*n* are formed in the display area DA. A plurality of pixel parts is defined by the gate lines GL1 to GL2*n* and the data lines DL1 to DLm. Each of the pixel part includes a TFT and a pixel electrode electrically connected to the TFT.

The dummy gate line DGL is disposed adjacent to the last gate line GL2*n* of the gate lines GL1 to GL2*n*, and receives a dummy gate signal transmitted from an external device (not shown). The last gate line GL2*n* is a gate line receiving the last gate signal.

The peripheral area PA includes a first peripheral area PA1, a second peripheral area PA2 and a third peripheral area PA3. The first peripheral area PA1 is disposed on first terminals of the data lines DL1 to DLm, and the second peripheral area PA2 is disposed on first terminals of the gate lines GL1 to GL2*n*. The third peripheral area PA3 is disposed on second terminals of the gate lines GL1 to GL2*n*.

The data driving circuit 200 includes a data driving chip 210 outputting the data signals to the data lines DL1 to DLm and a FPCB 220 having the data driving chip 210 mounted thereon. A first terminal of the FPCB 220 is connected to the first peripheral area PA1 of the display panel 100, and a second terminal of the FPCB 220 is connected to the PCB 400. The FPCB 220 electrically connects the PCB 400 to the display panel 100.

Although the above exemplary embodiments discuss the data driving chip 210 being mounted on the FPCB 220, it should be understood that the invention is not limited to that particular configuration. For example, the driving chip 210 may be mounted on the display panel 100. Alternatively, the driving chip 210 may be integrated on the first peripheral area PA1 of the display panel 100.

The first gate driving part 310 is integrated on the second peripheral area PA2. The first gate driving part 310 is electrically connected to the odd-numbered gate lines GL1, GL3, . . . , and GL2*n*−1 to output a gate signal to the odd-numbered gate lines GL1, GL3, . . . , and GL2*n*−1. The gate signal comprises a first voltage and a second voltage. The first voltage is sequentially transmitted to the odd-numbered gate lines GL1, GL3, . . . , and GL2*n*−1.

The first gate driving part 310 generates the gate signal for driving the odd-numbered gate lines GL1, GL3, . . . , and GL2*n*−1 by using a gate off voltage Voff received from an external device (not shown), a first vertical start signal STVF_L, a second vertical start signal STVB_L, a first clock signal CK_L and a second clock signal CKB_L.

The second gate driving part 320 is integrated on the third peripheral area PA3. The second gate driving part 320 is electrically connected to the even-numbered gate lines GL2, GL4, . . . , and GL2*n* to output the gate signal to the even-numbered gate lines GL2, GL4, . . . , and GL2*n*. The gate signal comprises the first voltage and the second voltage. The first voltage is sequentially transmitted to the even-numbered gate lines GL2, GL4, . . . , and GL2*n*.

The second gate driving part 320 generates the gate signals for driving the even-numbered gate lines GL2, GL4, . . . , and GL2*n* by using a gate off voltage Voff received from an external device, a third vertical start signal STVF_R, a fourth vertical start signal STVB_R, a third clock signal CK_R and a fourth clock signal CKB_R.

The first to fourth vertical start signals STVF_L, STVB_L, STVF_R and STVB_R, the first to fourth clock signals CK_L, CKB_L, CK_R and CKB_R may be transmitted from a timing control part (not shown) controlling driving timing of the first and second gate driving parts 310 and 320. The timing control part may be mounted on the PCB 400. Alternatively, the timing control part may be mounted or integrated on the display panel 100.

The display panel 100 may further include a connection line CL. The connection line CL is electrically connected to the dummy gate line DGL to transmit the dummy gate signal to the dummy gate line DGL. In this case, the dummy gate signal may be the second vertical start signal. The second vertical start signal comprises a fifth voltage and a sixth voltage. The levels of the fifth voltage and the sixth voltage may be the same as those of the first voltage and the second voltage.

Figure 5:
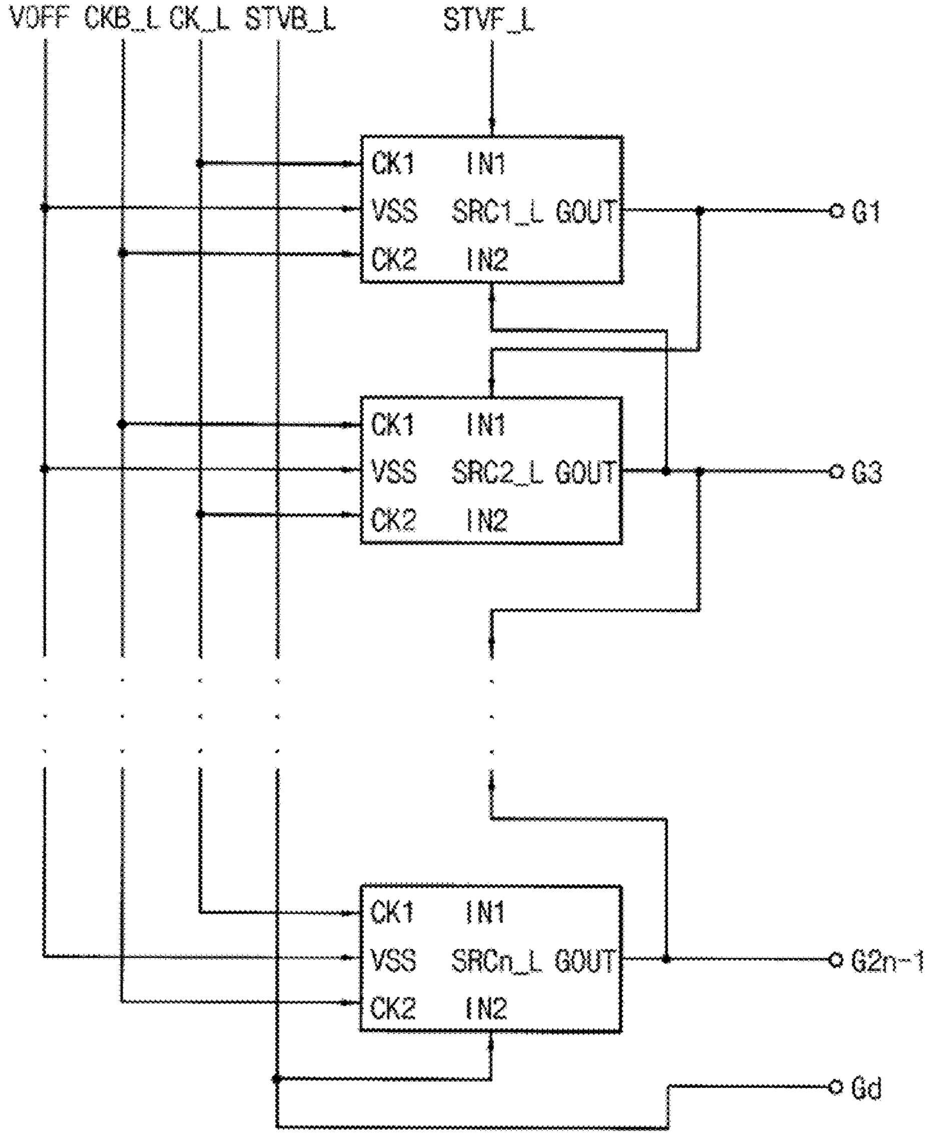
FIG. 5 is a block diagram illustrating the first gate driving part of FIG. 4.

FIG. 5 is a block diagram illustrating a first gate driving part of FIG. 4.

Referring to FIGS. 4 and 5, the first gate driving part 310 may include a plurality of odd-numbered stages SRC1_L to SRCn_L connected one after another to each other. The odd-numbered stages SRC1_L to SRCn_L are respectively connected to the odd-numbered gate lines GL1, GL3, . . . , and GL2*n*−1 to output the gate signal to the odd-numbered gate lines GL1, GL3, . . . , and GL2*n*−1. The odd-numbered stages SRC1_L to SRCn_L are sequentially output the first voltage included in the gate signal to the odd-numbered gate lines GL1, GL3, . . . , and GL2*n*−1.

Each of the odd-numbered stages SRC1_L to SRCn_L may include a first clock terminal CK1, a second clock terminal CK2, a first input terminal IN1, a second input terminal IN2, a voltage terminal VSS and an output terminal GOUT.

The first and second clock terminals CK1 and CK2 receive a first clock signal CK_L and a second clock signal CKB_L having phases opposite to each other. For example, the first clock terminal CK1 of a plurality of stages SRC1_L, SRC3_L, . . . , and SRCn−1_L receives the first clock signal CK_L, and the second clock terminal CK2 of the stages receives the second clock signal CKB_L. The first clock terminal CK1 of a plurality of stage SRC2_L, SRC4_L, . . . , and SRCn_L receives the second clock signal CKB_L, and a second clock terminal CK2 of the stages receives the first clock signal CK_L.

The first input terminal IN1 receives the first vertical start signal STVF_L or an output signal of a previous odd-numbered stage. For example, the first input terminal IN1 of the first odd-numbered stage SRC1_L receives the first vertical start signal STVF_L, and the first input terminal IN1 of the second to n-th odd-numbered stages SRC2_L to SRCn_L receives the output signal of previous odd-numbered stages SRC1_L to SRCn−1_L. The first vertical start signal STVF_L is a signal starting the driving of the odd-numbered gate lines GL1, GL3, . . . , and GL2*n*−1.

The second input terminal IN2 receives the second vertical start signal STVB_L or an output signal of a next odd-numbered stage. For example, the second input terminal IN2 of the last odd-numbered stage SRCn_L receives the second vertical start signal STVB_L. The second vertical start signal STVB_L is a signal stopping the driving of the odd-numbered gate lines GL1, GL3, . . . , and GL2*n*−1.

The voltage terminal VSS receives the gate off voltage VOFF.

The output terminal GOUT is one-to-one connected to odd-numbered gate lines GL1, GL3, . . . , GL2*n*−1 to output gate signals to the odd-numbered gate lines GL1, GL3, . . . , GL2*n*−1. The output terminal GOUT is electrically connected to the second input terminal IN2 of a previous odd-numbered stage to provide the second input terminal IN2 of the previous odd-numbered stage with the output signal. The output terminal GOUT is electrically connected to the first input terminal IN1 of the next odd-numbered stage to provide the first input terminal IN1 of the next odd-numbered stage with the output signal.

Figure 6:
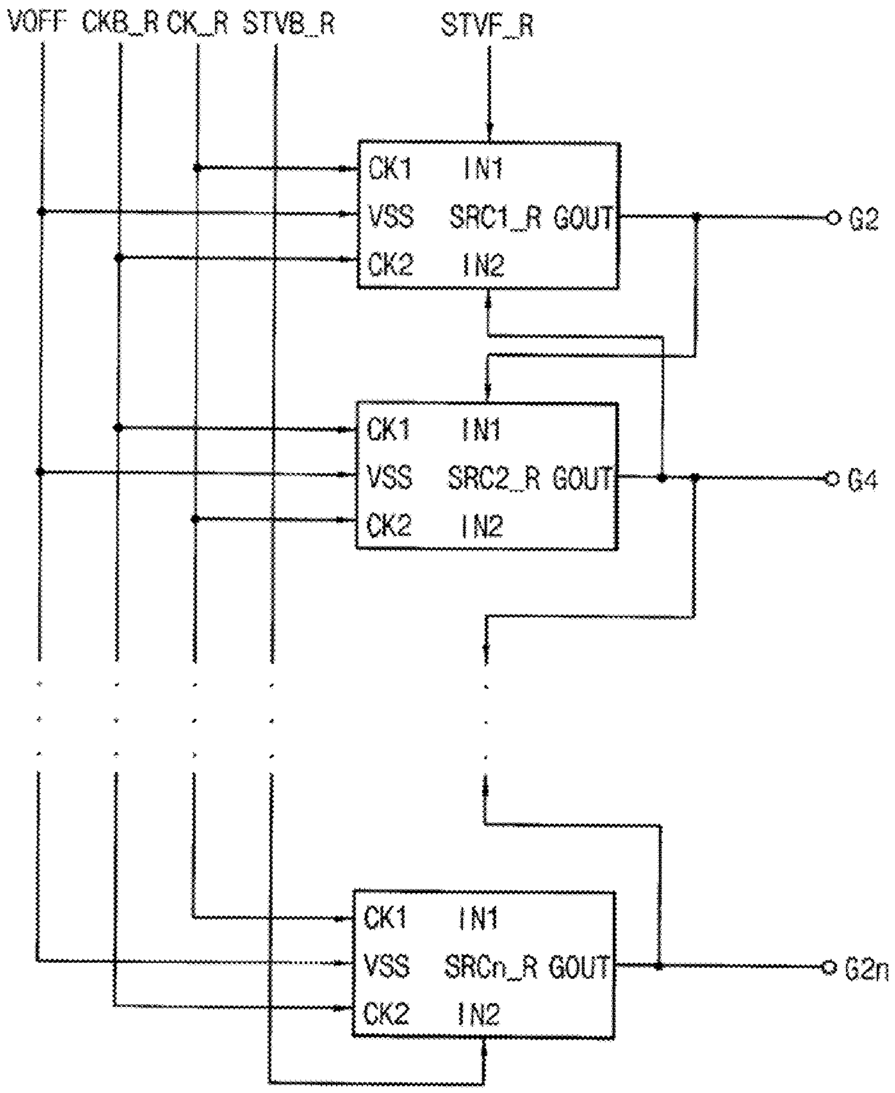
FIG. 6 is a block diagram illustrating the second gate driving part of FIG. 4.

FIG. 6 is a block diagram illustrating a second gate driving part of FIG. 4.

Referring to FIGS. 4 and 6, the second gate driving part 320 may include a plurality of even-numbered stages SRC1_R to SRCn_R. The even-numbered stages SRC1_R to SRCn_R are respectively connected to the even-numbered gate lines GL2, GL4, . . . , and GL2*n* to output the gate signal to the even-numbered gate lines GL2, GL4, . . . , and GL2*n*. The second stages SRC1_R to SRCn_R are sequentially output the first voltage included in the gate signal to the even-numbered gate lines GL2, GL4, . . . , and GL2*n*.

Each of the even-numbered stages SRC1_R to SRCn_R may include a first clock terminal CK1, a second clock terminal CK2, a first input terminal IN1, a second input terminal IN2, a voltage terminal VSS and an output terminal GOUT.

The first and second clock terminals CK1 and CK2 receive a third clock signal CK_R and a fourth clock signal CKB_R having phases opposite to each other. For example, the first clock terminal CK1 of a plurality of even-numbered stages SRC1_R, SRC3_R, . . . , and SRCn−1_R receives the third clock signal CK_R and the second clock terminal CK2 of the stages receives the fourth clock signal CKB_R. The first clock terminal CK1 of a plurality of even-numbered stages SRC2_R, SRC4_R, . . . , and SRCn_R receives the fourth clock signal CKB_R, and a second clock terminal CK2 of the stages receives the third clock signal CK_R. The third clock signal CK_R is a signal delayed for 1H (H is horizontal cycle) with respect to the first clock signal CK_L.

The first input terminal IN1 receives a third vertical start signal STVF_R or an output signal of a previous even-numbered stage. For example, a first input terminal IN1 of the first even-numbered stage SRC1_R in which a previous even-numbered stage does not exist receives the third vertical start signal STVF_R. A first input terminal IN1 of the remaining stages SRC2_R to SRCn_R receives an output signal of previous even-numbered stages. The third vertical start signal STVF_R is a signal starting the driving of the even-numbered gate lines GL2, GL4, . . . , and GL2*n*. The third vertical start signal STVF_R is a signal delayed for 1H with respect to the first vertical start signal STVF_L.

The second input terminal IN2 receives the fourth vertical start signal STVB_R or an output signal of a next even-numbered stage. For example, the second input terminal IN2 of the last stage SRCn_R in which the next even-numbered stage does not exist receives the fourth vertical start signal STVB_R. The fourth vertical start signal STVB_R is a signal stopping the driving of the even-numbered gate lines.

The voltage terminal VSS receives the gate off voltage VOFF.

The output terminal GOUT is one-to-one connected to even-numbered gate lines GL2, GL4, . . . , GL2*n* to output gate signals to the even-numbered gate lines GL2, GL4, . . . , GL2*n*. The output terminal GOUT is electrically connected to the second input terminal IN2 of a previous even-numbered stage to provide the second input terminal IN2 of the previous even-numbered stage with the output signal. The output terminal GOUT is electrically connected to the first input terminal IN1 of the next even-numbered stage to provide the first input terminal IN1 of the next even-numbered stage with the output signal.

Figure 7:
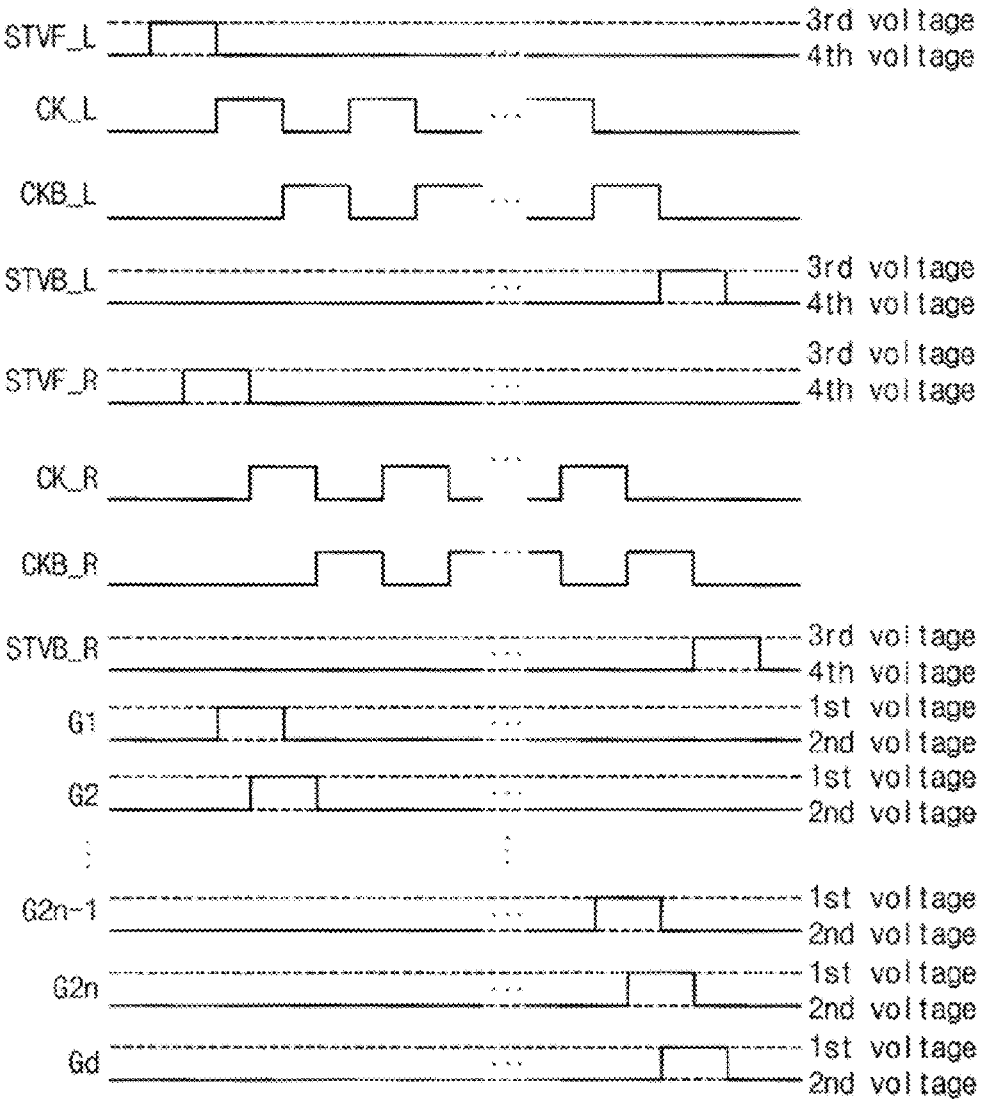
FIG. 7 is a waveform diagram illustrating input and output signals of the first and second gate driving parts of FIGS. 5 and 6.

FIG. 7 is a waveform diagram illustrating input and output signals of the first and second gate driving parts of FIGS. 5 and 6.

Referring to FIGS. 5 and 7, the first input terminal IN1 of the odd-numbered stages SRC1_L to SRCn_L of the first gate driving part 310 receives the first vertical start signal STVF_L or an output signal of a previous odd-numbered stage. The first and second clock terminals CK1 and CK2 of the odd-numbered stages receive the first and second clock signals CK_L and CKB_L. The second input terminal IN2 of the odd-numbered stages receives the second vertical start signal STVB_L or an output signal of a next odd-numbered stage.

In this case, the first and second vertical start signals STVF_L and STVB_L have a pulse width of 2H. The first vertical start signals STVF_L is a signal starting the driving of the odd-numbered gate lines GL1, GL3, . . . , and GL2$n$−1. The second vertical start signals STVB_L is a signal stopping the driving of the odd-numbered gate lines GL1, GL3, . . . , and GL2$n$−1. The second vertical start signal STVB_L comprises the fifth voltage and the sixth voltage. Levels of the fifth and sixth voltages are substantially the same as those of the first and second voltages included in the gate signal. The first and second clock signals CK_L and CKB_L have a pulse width of 2H and are inverted for a 2H period.

The first input terminal IN1 of the even-numbered stages SRC1_R to SRCn_R of the second gate driving part 320 receives the third vertical start signal STVF_R or an output signal of a previous even-numbered stage. The first and second clock terminals CK1 and CK2 of the stages receive the third and fourth clock signals CK_R and CKB_R. The second input terminal IN2 of the stages receives the fourth vertical start signal STVB_R or an output signal of a next even-numbered stage.

In this case, the third vertical start signal STVF_R is a signal starting the driving of the even-numbered gate lines GL2, GL4, . . . , and GL2$n$. The fourth vertical start signal STVB_R is a signal stopping the driving of the even-numbered gate lines GL2, GL4, . . . , and GL2$n$. The third vertical start signal STVF_R is a signal delayed for 1H with respect to the first vertical start signals STVF_L. The third and fourth clock signals CK_R and CKB_R have a pulse width of 2H and are inverted for a 2H period. The third clock signal CK_R is a signal delayed for 1H with respect to the first clock signal CK_L.

The odd-numbered stages SRC1_L to SRCn_L sequentially output the first voltage of the gate signals G1, G3 and G2$n$−1 to the odd-numbered gate lines GL1, GL3, . . . , and GL2$n$−1 of the gate lines GL1 to GL2$n$ based on the first and second clock signals CK_L and CKB_L.

The even-numbered stages SRC1_R to SRCn_R sequentially output the first voltage of the gate signal G2, G4 and G2$n$ to the even-numbered gate lines GL2, GL4, and GL2$n$ of the gate lines GL1 to GL2$n$ based on the third and fourth clock signals CK_R and CKB_R.

For example, the first stage SRC1_L of the odd-numbered stages SRC1_L to SRCn_L responds to the first vertical start signals STVF_L to output a high level of the first clock signal CK_L as a first voltage of a gate signal G1 to the first gate line GL1.

The first stage SRC1_R of the even-numbered stages SRC1_R to SRCn_R responds to the third vertical start signals STVF_R to output a high level of the third clock signal CK_R as a first voltage of a gate signal G2 to the second gate line GL2. The first voltage of the gate signal has a pulse width of 2H and is sequentially delayed for 1H to be applied to the odd numbered and even numbered gate lines.

The last stage SRCn_L of the odd-numbered stages SRC1_L to SRCn_L responds to the output signal of the previous odd-numbered stage SRCn−1_L to output a high level of the second clock signal CKB_L as a first voltage of a gate signal G2$n$−1 to the last gate line GL2$n$−1 of the odd-numbered gate lines GL1, GL3, . . . , and GL2$n$−1. The last stage SRCn_L responds to a high level of the second vertical start signal STVB_L applied to the second input terminal IN2 to convert the last gate signal G2$n$−1 outputted to the last gate line GL2$n$−1 to the second voltage.

Alternatively, the last stage SRCn_R of the even-numbered stages SRC1_R to SRCn_R responds to the output signal of the previous even-numbered stage SRCn−1_R to output a high level of the fourth clock signal CKB_R as the first voltage of the last gate signal G2$n$ to the last gate line GL2$n$. The last stage SRCn_R responds to a high level of the fourth vertical start signal STVB_R applied to the second input terminal IN2 to convert the last gate signal G2$n$ outputted to the last gate line GL2$n$ to the second voltage.

The dummy gate line DGL disposed following the last gate line GL2$n$ receives the second vertical start signal STVB_L transmitted from an external device through the connection line CL.

A dummy gate signal Gd applied to the dummy gate line DGL is a signal comprising the fifth voltage which is delayed for 1H with respect to the first voltage of the gate signal applied to the last gate line GL2$n$.

According to an exemplary embodiment, a pixel electrode connected to the last gate line GL2$n$ is affected by a dummy gate signal applied to the dummy gate line DGL. Thus, a deviation of a kickback voltage of a pixel electrode connected to the last gate line GL2$n$ is generated to prevent the generation of flicker.

According to an exemplary embodiment of the present invention, a dummy gate line is adjacent to the last gate line, and a pixel electrode connected to the last gate line is affected by a dummy gate signal applied to the dummy gate line. Thus, flicker may be prevented from being generated in a pixel electrode connected to the last gate line and the display quality of a display device may be increased.

The foregoing is illustrative of exemplary embodiments of the present invention and is not to be construed as limiting. Although a few exemplary embodiments of the present invention have been described, those skilled in the art will readily appreciate that many modifications are possible in the exemplary embodiments without materially departing from the present invention.

What is claimed is:

1. A display panel comprising:

a gate driving circuit disposed in a peripheral area surrounding a display area;

a plurality of gate lines disposed in the display area and configured to receive a gate signal outputted from the gate driving circuit, the gate signal comprising a first voltage and a second voltage, and the gate driving circuit being configured to sequentially transmit the first voltage of the gate signal to the plurality of gate lines;

a plurality of data lines disposed in the display area crossing the gate lines;

a dummy gate line disposed adjacent to a last gate line of the plurality of gate lines and configured to receive a dummy gate signal transmitted from an external device; and a connection line electrically connected to the dummy gate line and configured to transmit the dummy gate signal to the dummy gate line, wherein the gate driving circuit comprises a plurality of stages serially connected to each other, wherein a first stage of the plurality of stages is configured to receive a first vertical start signal starting a driving of the plurality of gate lines, and a last stage of the plurality of stages is configured to receive a second vertical start signal stopping the driving of the plurality of gate lines, and wherein the dummy gate signal is the second vertical start signal.

2. The display panel of claim 1, wherein the dummy gate signal comprises a third voltage and a fourth voltage, and levels of the third voltage and the fourth voltage are substantially the same as those of the first voltage and the second voltage, respectively.

3. The display panel of claim 1, wherein the gate driving circuit comprises:

a first gate driving part having a plurality of odd-numbered stages serially connected to each other, the first gate driving part connected to a plurality of odd-numbered gate lines of the plurality of gate lines and being configured to output the gate signal to the odd-numbered gate lines; and a second gate driving part having a plurality of even-numbered stages serially connected to each other, the second gate driving part connected to a plurality of even-numbered gate lines of the plurality of gate lines and being configured to output the gate signal to the even-numbered gate lines.

4. A display panel comprising:

a gate driving circuit disposed in a peripheral area surrounding a display area;

a plurality of gate lines disposed in the display area and configured to receive a gate signal outputted from the gate driving circuit, the gate signal comprising a first voltage and a second voltage, and the gate driving circuit being configured to sequentially transmit the first voltage of the gate signal to the plurality of gate lines;

a plurality of data lines disposed in the display area crossing the gate lines; and a dummy gate line disposed adjacent to a last gate line of the plurality of gate lines and configured to receive a dummy gate signal transmitted from an external device, wherein the gate driving circuit comprises:

a first gate driving part having a plurality of odd-numbered stages serially connected to each other, the first gate driving part connected to a plurality of odd-numbered gate lines of the plurality of gate lines and being configured to output the gate signal to the odd-numbered gate lines; and a second gate driving part having a plurality of even-numbered stages serially connected to each other, the second gate driving part connected to a plurality of even-numbered gate lines of the plurality of gate lines and being configured to output the gate signal to the even-numbered gate lines, wherein a first stage of the odd-numbered stages is configured to receive a first vertical start signal starting a driving of the odd-numbered gate lines, and a last stage of the odd-numbered stages is configured to receive a second vertical start signal stopping the driving of the gate lines of the odd-numbered stage, a first stage of the even-numbered stages is configured to receive a third vertical start signal starting a driving of the even-numbered gate lines, and a last stage of the even-numbered stages is configured to receive a fourth vertical start signal stopping the driving of the gate lines of the even-numbered stage, and the dummy gate signal is the second vertical start signal.

5. A display device comprising:

a display panel comprising a display area and a peripheral area surrounding the display area, the display area having a plurality of gate lines, a plurality of data lines crossing the gate lines, and a dummy gate line disposed adjacent to a last gate line of the plurality of gate lines, the dummy gate line being configured to receive a dummy gate signal transmitted from an external device;

a gate driving circuit integrated in the peripheral area and configured to output a gate signal to the gate lines, the gate signal comprising a first voltage and a second voltage, and the gate driving circuit being configured to sequentially output the first voltage of the gate signal to the gate lines; and a data driving circuit configured to output a plurality of data signals to the data lines, wherein the display panel further comprises a connection line electrically connected to the dummy gate line and configured to transmit the dummy gate signal to the dummy gate line, wherein the gate driving circuit comprises a plurality of stages serially connected to each other, wherein a first stage of the plurality of stages is configured to receive a first vertical start signal starting a driving of the plurality of gate lines, and a last stage of the plurality of stages is configured to receive a second vertical start signal stopping the driving of the plurality of gate lines, and wherein the dummy gate signal is the second vertical start signal.

6. The display device of claim 5, wherein a last gate line of the plurality of the gate lines is configured to receive a last first voltage of the gate signal outputted from the gate driving circuit.

7. The display device of claim 5, wherein the gate driving circuit comprises:

a first gate driving part having a plurality of odd-numbered stages serially connected to each other, the first gate driving part being connected to a plurality of odd-numbered gate lines of the plurality of gate lines and being configured to output the gate signal to the odd-numbered gate lines; and a second gate driving part having a plurality of even-numbered stages serially connected to each other, the second gate driving part being connected to a plurality of even-numbered gate lines of the plurality of gate lines and being configured to output the gate signal to the even-numbered gate lines.

8. The display device of claim 7, wherein a first stage of the odd-numbered stages is configured to receive a first vertical start signal starting a driving of the odd-numbered gate lines, and a last stage of the odd-numbered stages is configured to receive a second vertical start signal stopping the driving of the gate lines of the odd-numbered stage, a first stage of the even-numbered stages is configured to receive a third vertical start signal starting a driving of the even-numbered gate lines, and a last stage of the even-numbered stages is configured to receive a fourth vertical start signal stopping the driving of the gate lines of the even-numbered stage.

9. The display device of claim 8, wherein the third vertical start signal is configured to be delayed for one horizontal cycle with respect to the first vertical start signal.

10. The display device of claim 8, wherein the dummy gate signal is the second vertical start signal.

11. The display device of claim 8, wherein a last gate line of the plurality of gate lines is configured to receive a last first voltage of gate signal outputted from the first gate driving part.

12. The display device of claim 8, wherein the odd-numbered stages are integrated in a first peripheral area corresponding to a first terminal of the plurality of gate lines, and the even-numbered stages are integrated in a second peripheral area corresponding to a second terminal of the plurality of gate lines.

13. The display device of claim 8, wherein the odd-numbered stages are configured to receive a first clock signal and a second clock signal having a phase opposite to the first clock signal, and the even-numbered stages are configured to receive a third clock signal delayed for one horizontal cycle with respect to the first clock signal and a fourth clock signal having a phase opposite to the third clock signal.

14. A display device comprising:

a display panel comprising a display area and a peripheral area surrounding the display area, the display area having a plurality of gate lines, a plurality of data lines crossing the gate lines, and a dummy gate line disposed adjacent to a last gate line of the plurality of gate lines, the dummy gate line being configured to receive a dummy gate signal transmitted from an external device;

a gate driving circuit integrated in the peripheral area and configured to output a gate signal to the gate lines, the gate signal comprising a first voltage and a second voltage, and the gate driving circuit being configured to sequentially output the first voltage of the gate signal to the gate lines; and a data driving circuit configured to output a plurality of data signals to the data lines, wherein the gate driving circuit comprises:

a first gate driving part having a plurality of odd-numbered stages serially connected to each other, the first gate driving part being connected to a plurality of odd-numbered gate lines of the plurality of gate lines and being configured to output the gate signal to the odd-numbered gate lines; and a second gate driving part having a plurality of even-numbered stages serially connected to each other, the second gate driving part being connected to a plurality of even-numbered gate lines of the plurality of gate lines and being configured to output the gate signal to the even-numbered gate lines, wherein a first stage of the odd-numbered stages is configured to receive a first vertical start signal starting a driving of the odd-numbered gate lines, and a last stage of the odd-numbered stages is configured to receive a second vertical start signal stopping the driving of the gate lines of the odd-numbered stage, a first stage of the even-numbered stages is configured to receive a third vertical start signal starting a driving of the even-numbered gate lines, and a last stage of the even-numbered stages is configured to receive a fourth vertical start signal stopping the driving of the gate lines of the even-numbered stage, and wherein the dummy gate signal is the second vertical start signal.

15. The display device of claim 14, wherein the display panel further comprises a connection line electrically connected to the dummy gate line and configured to transmit the dummy gate signal to the dummy gate line.

16. The display device of claim 15, wherein the gate driving circuit comprises a plurality of stages serially connected to each other, wherein a first stage of the plurality of stages is configured to receive a first vertical start signal starting a driving of the plurality of gate lines, and a last stage of the plurality of stages is configured to receive a second vertical start signal stopping the driving of the plurality of gate lines.

17. The display device of claim 16, wherein the dummy gate signal is the second vertical start signal.

18. The display device of claim 14, wherein a last gate line of the plurality of the gate lines is configured to receive a last first voltage of the gate signal outputted from the gate driving circuit.

19. The display device of claim 14, wherein the third vertical start signal is configured to be delayed for one horizontal cycle with respect to the first vertical start signal.

20. The display device of claim 14, wherein a last gate line of the plurality of gate lines is configured to receive a last first voltage of gate signal outputted from the first gate driving part.

21. The display device of claim 14, wherein the odd-numbered stages are integrated in a first peripheral area corresponding to a first terminal of the plurality of gate lines, and the even-numbered stages are integrated in a second peripheral area corresponding to a second terminal of the plurality of gate lines.

22. The display device of claim 14, wherein the odd-numbered stages are configured to receive a first clock signal and a second clock signal having a phase opposite to the first clock signal, and the even-numbered stages are configured to receive a third clock signal delayed for one horizontal cycle with respect to the first clock signal and a fourth clock signal having a phase opposite to the third clock signal.

* * * * *